United States Patent
Endoh et al.

(10) Patent No.: US 6,654,337 B2
(45) Date of Patent: Nov. 25, 2003

(54) MAGNETO-OPTICAL RECORDING MEDIUM HAVING PIT PITCH GREATER THAN GROOVE PITCH

(75) Inventors: Sohmei Endoh, Miyagi (JP); Manabu Satoh, Miyagi (JP); Mitsuo Arima, Miyagi (JP); Jun Shimizu, Miyagi (JP); Etsuro Ikeda, Miyagi (JP); Hirotaka Ozawa, Tokyo (JP); Akitoshi Suzuki, Tokyo (JP); Masayuki Takakuwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 09/922,731

(22) Filed: Aug. 7, 2001

(65) Prior Publication Data

US 2002/0024924 A1 Feb. 28, 2002

(30) Foreign Application Priority Data

Aug. 18, 2000 (JP) ........................... 2000-248385

(51) Int. Cl.⁷ ................................. G11B 7/24
(52) U.S. Cl. .................. 369/275.4; 428/64.4
(58) Field of Search ............... 369/275.4, 13.55, 369/275.2, 13.54, 275.3, 277, 278, 279; 428/64.3, 64.1, 64.4, 64.2

(56) References Cited

U.S. PATENT DOCUMENTS

| | | | |
|---|---|---|---|
| 5,689,495 A | * 11/1997 | Tsuchiya et al. | 369/275.4 |
| 6,016,302 A | * 1/2000 | Yamatsu et al. | 369/275.4 |
| 6,128,270 A | * 10/2000 | Nishikawa | 369/275.4 |
| 6,335,916 B1 | 1/2002 | Endo et al. | |
| 6,349,085 B1 | * 2/2002 | Endoh et al. | 369/275.4 |
| 6,487,164 B1 | 11/2002 | Endoh et al. | |

FOREIGN PATENT DOCUMENTS

JP  2002-197725 A  *  7/2002  ............ 369/275.4

* cited by examiner

Primary Examiner—Tan Dinh
(74) Attorney, Agent, or Firm—Oblon, Spivak, McClelland, Maier & Neustadt, P.C.

(57) ABSTRACT

A recording medium and a recoding medium master, and a method of manufacturing the recording medium which comply with the standard of recording/reproducing characteristic established in the MD standard while enabling precise discrimination of the pit track and groove track and optical detection of the pits by optical pickup and the like are provided. Pits and grooves are arranged on a surface of a disc-shaped substrate so as to form a grooves and the ratio is from 1.00 exclusive to 1.13 inclusive. It is preferable that the track pitch of the grooves is from 1.50 μm inclusive to 1.70 μm exclusive. The width of the pits and grooves in the radial direction of the substrate is the same.

12 Claims, 6 Drawing Sheets

| Recording/ Reproducing time (min.) | Linear velocity (m/s) | Track pitch (μm) |
|---|---|---|
| 60 | 1.40 | 1.60 |
| 74 | 1.20 | 1.60 |
| 80 | 1.20 | 1.51 |

| Magneto-optical disc for evaluation | Linear velocity (m/s) | Exposing power of pit (mW) | Exposing power of groove (mW) | Pit track pitch (μm) | Groove track pitch (μm) |
|---|---|---|---|---|---|
| Type A | 1.20 | 0.5 | 2.0 | 1.70 | 1.51 |
| Type B | 1.20 | 0.5 | 2.0 | 1.60 | 1.51 |
| Type C | 1.20 | 0.5 | 2.0 | 1.51 | 1.51 |

| Magneto-optical disc for evaluation | Pit | Groove |
|---|---|---|
| I3/Itop | > 0.15 | — |
| I11/Itop | 0.3~0.6 | — |
| RC | +0.15~−0.30 | −0.20~−0.35 |
| push−pull | 0.04~0.11 | 0.10~0.18 |
| crosstalk | < 0.50 | — |

FIG.7

| Mgneto-optical disc for evaluation | Pit track pitch (μm) | Groove track pitch (μm) | Ratio of track pitches of pit to groove (μm) |
|---|---|---|---|
| Type A | 1.70 | 1.51 | 1.13 |
| Type B | 1.60 | 1.51 | 1.06 |
| Type C | 1.51 | 1.51 | 1.00 |

FIG.8

| Mageto-optical disc for evaluation | Pit track pitch (μm) | Push−pull of pit | Crosstalk of pit |
|---|---|---|---|
| Type A | 1.70 | 0.071 | 0.33 |
| Type B | 1.60 | 0.060 | 0.41 |
| Type C | 1.51 | 0.045 | 0.50 |

FIG.9

MAGNETO-OPTICAL RECORDING MEDIUM HAVING PIT PITCH GREATER THAN GROOVE PITCH

BACKGROUND OF THE INVENTION

1. Field of the Invention

The present invention relates to a recording medium in which optically detectable pits and magneto-optically detectable grooves are arranged so as to form a sequential spiral-shaped track and a recording medium master used for manufacturing the recording medium, and to a method of manufacturing the same.

2. Description of the Related Art

An optical recording medium records or reproduces (reads-out) information or data based on the reflection light of the laser irradiated with respect to a signal recording layer of a substrate in a data recording/reproducing apparatus. Examples of known optical recording media are optical discs such as a CD-ROM (Compact Disc-Read Only Memory), and a magneto-optical disc or a phase-change optical disc capable of rewriting signals.

In general, for example, formed on a recording medium such as MD (Mini Disc) are grooves for recording various kinds of information as recording contents and pits for recording disc information such as kind and recording capacity. The grooves are provided along the circumferential direction of the disc and its planar pattern wobbles with a predetermined width in the radial direction of the disc. The planar pattern of pits is oval shape and its overall shape is three-dimensional like a soccer-stadium shape. A plurality of pits are arranged along the circumferential direction of the disc thereby forming a track.

The grooves are formed in a data recording area and the pits are formed in a read-in track area so as to carry TOC (Table of Contents) information as the disc information as mentioned above or information such as pulse signals with predetermined cycle. In the conventional optical disc such as an MD, the area where the pits are formed and the area where the grooves are formed are mixed, and therefore form a spiral-shaped track as the whole disc.

In general, the width of the groove, which is used for recording data, is wider than that of the pit in order to record/read-out information precisely. In other words, when data is recorded on the grooves with a narrow width, noise increases and the S/N ratio decreases. Possibly, the data is recorded on land having the width wider than the groove. However, it is not practical since the phases of the neighboring grooves do not substantially coincide in the radial direction of the disc, so that the width of the land always varies, thereby making fluctuations of the reproducing signals significant. Therefore, it is preferable to record data on grooves having a wide width.

The recording/reproducing time of an MD of the related art is 60 minutes or 74 minutes. Recently, 80-minutes MD has also been proposed. In an ordinary MD, based on the unified standard and the like, a read-in track area where pits carrying TOC information and the like are formed is set to be the area a radius of 14.5 mm to 16.0 mm, and a data recording area where grooves for recording/reproducing data are formed is set to be the area a radius of 16.0 mm to 30.5 mm, respectively. The recording/reproducing time is determined depending on the recording/reproducing speed (linear velocity) of the grooves and the track pitch. In the MD standard, the linear velocity is from 1.20 m/s to 1.40 m/s both inclusive, and the track pitch is 1.60±0.10 $\mu$m.

Figure 1:
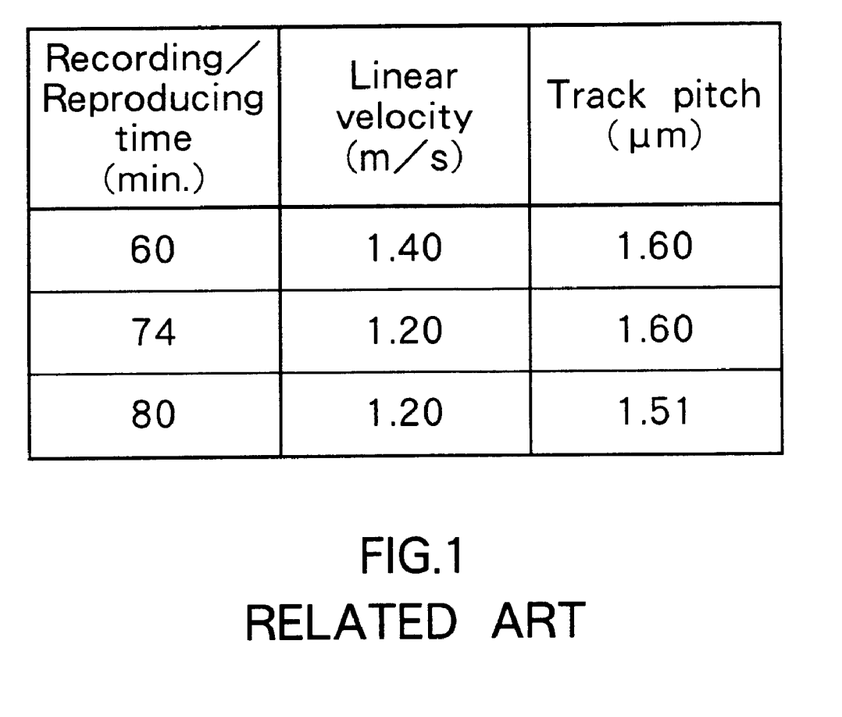
FIG. 1 shows the general standards of an ordinary MD in respect to recording/reproducing time, linear velocity at the time of reading data, and the track pitch.

The standards of MD comprising a sequential spiral-shaped track as described are shown in FIG. 1 in respect to recording/reproducing time, linear velocity at the time of reading data and the track pitch. Upon changing the recording/reproducing time from 60 minutes to 74 minutes, the linear velocity changes from 1.40 m/s to 1.20 m/s. Further, upon changing the recording/reproducing time from 74 minutes to 80 minutes, the linear velocity stays at 1.20 m/s as is the minimum value of the MD standard, whereas the track pitch is required to be changed from 1.60 $\mu$m to 1.51 $\mu$m. This is because it is necessary to reduce the linear velocity for reading or to further narrow the track pitch in order to increase the recording/reproducing time without changing the disc size or the optical pick-up characteristics of a data recording/reproducing apparatus.

In an optical disc such as an MD or a magneto-optical (MO) disc of the related art, the track of pits and the track of grooves are provided so as to form a spiral shape and the pitches of the pits and the grooves are the same. Therefore, in the conventional apparatus for fabricating a master used for manufacturing an optical disc, the concavo-convex patterns of the pits and the grooves are formed at a constant track pitch almost over the entire surface of the disc from the read-in track area where the pits are formed to the data recording area where the grooves are formed. Accordingly, changing of the track pitch is not taken into consideration but various kinds of techniques have been developed to maintain a constant track pitch as precise as possible.

Especially, in case of MD capable of recording/reproducing for 80 minutes, it is necessary to narrow the track pitch of the grooves between 1.50 $\mu$m and 1.51 $\mu$m, which is narrower than 1.60 $\mu$m in the related art. Therefore, the track pitches of the pits and grooves are standardized to 1.50 $\mu$m.

However, there may be a case where optical detection of the pits becomes difficult or impossible when both of the track pitches of the pits and grooves are set to be as narrow as 1.50 $\mu$m. In the MD standard, servo signals such as push-pull signal and RC (Radial Constant) and the signal characteristic of the pits are determined and standardized based on the track pitch of 1.60 $\mu$m. Therefore, if the track pitch is 1.50 $\mu$m, it is difficult to meet the standard of general recording/reproducing characteristic established in the MD standard in terms of push-pull signal, crosstalk and the like especially regarding the pits.

SUMMARY OF THE INVENTION

The invention has been designed to overcome the foregoing problems. The object of the invention is to provide: a recording medium capable of complying with the standard of recording/reproducing characteristic established in the MD standard and capable of reliably performing optical detection of the pits in an optical disc or a magneto-optical disc in which the pit string and the pattern of the grooves in the longitudinal direction are provided to form a sequential spiral-shaped track; a master used for fabricating the recording medium; and a method of manufacturing the recording medium and the recording medium master.

A recording medium of the invention comprises pits and grooves on a surface of a disc-shaped substrate being arranged so as to form a spiral-shaped track, and is formed to be capable of reading information carried in the pits and the grooves by irradiating a laser with a wavelength of 0.78±0.01 $\mu$m and NA of 0.45±10.01 along the track. The ratio of track pitch of the pits to the track pitch of the grooves is from 1.00 exclusive to 1.13 inclusive.

A recording medium of the invention comprises pits and grooves on a surface of a disc-shaped substrate being arranged so as to form a spiral-shaped track, and is formed to be capable of reading information carried in the pits and the grooves along the track. The ratio of track pitch of the pits to the track pitch of the grooves is from 1.00 exclusive to 1.13 inclusive.

In a recording medium and a recording medium master, and a method of manufacturing a recording medium of the invention, the track pitch of the pits is wider than that of the grooves and the ratio is from 1.00 exclusive to 1.13 inclusive. In the related art, the track pitches of the pits and grooves are the same. This may result in difficulty or impossibility of the optical detection of the pits. In the present invention, the track pitch of the pits is wider than that of the grooves and its ratio is from 1.00 exclusive to 1.13 inclusive. This enables to perform reliable optical detection of the pits.

By setting the track pitch of the grooves from 1.50 $\mu$m inclusive to 1.70 $\mu$m exclusive, recording/reproducing of various kinds of information on/from a recording medium of the invention can also be performed using an ordinary data recording/reproducing apparatus with the track pitch of 1.60±0.10 $\mu$m.

For example, in order to achieve a recording medium capable of performing a high-capacity or a long-time recording/reproducing such as an MD which is capable of recording/reproducing for 80 minutes, it is necessary to increase the data storage capacity by setting the track pitch of the grooves as narrow as about 1.51 $\mu$m. In this case, if the track pitch of the pits is 1.13 times of the track pitch of the grooves, which is the maximum ratio as mentioned above, the track pitch of the pits is about 1.70 $\mu$m. Thereby, the track pitches of both the grooves and pits are within the permissible range of 1.60±0.10 $\mu$m, which is a requirement of the track pitch in a standard data recording/reproducing apparatus. Therefore, the track pitches of both the pits and grooves can read/write information with a standard data recording/reproducing apparatus.

The present invention is preferable specifically for a recording medium which complies with the standards of MD 80 and the master, and a method of manufacturing the recording medium. However, it is not limited to these.

Other and further objects, features and advantages of the invention will appear more fully from the following description.

DETAILED DESCRIPTION OF THE PREFERRED EMBODIMENTS

In the followings, an embodiment of the invention will be described in detail by referring to the drawings.

Figure 2:
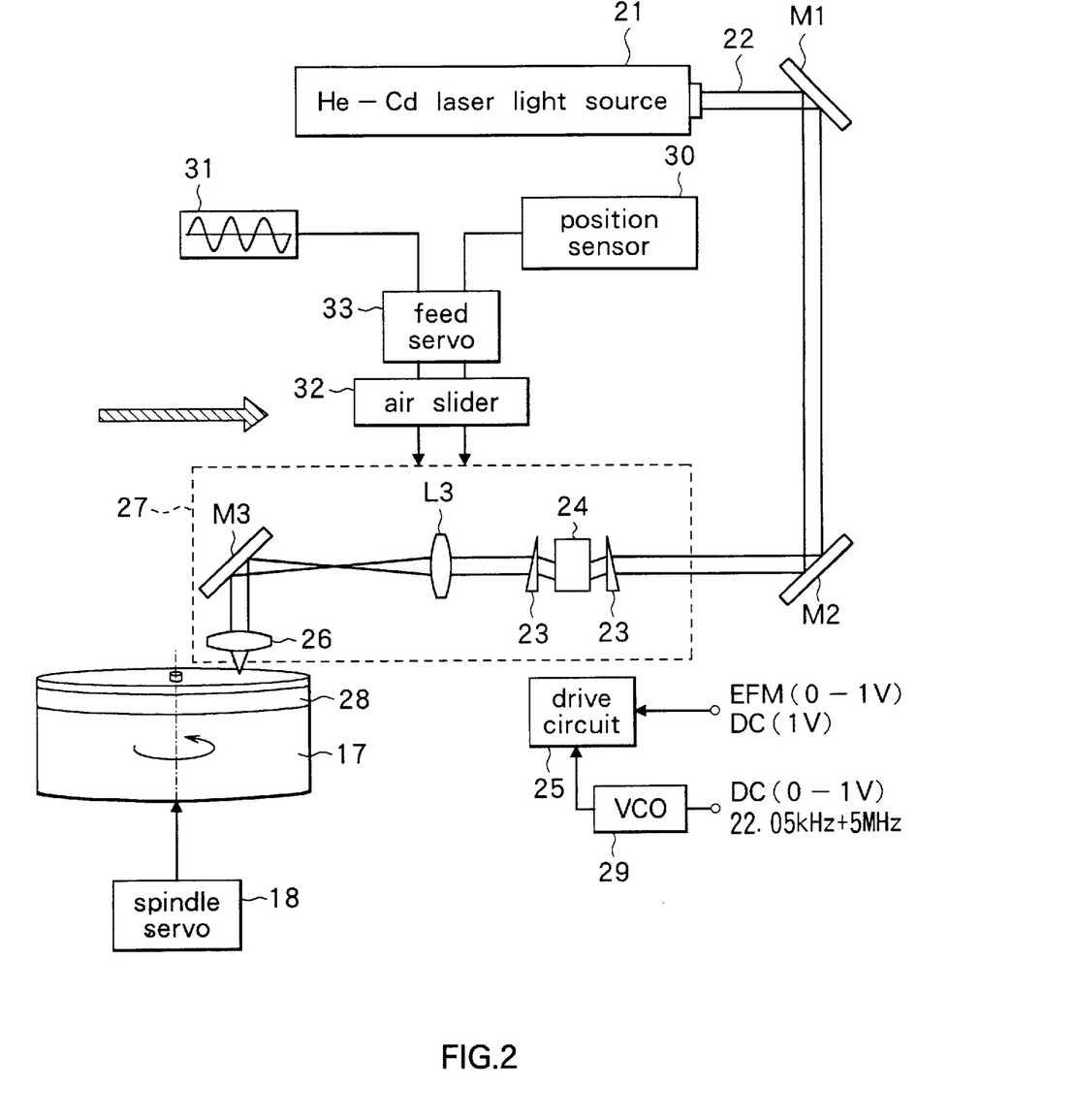
FIG. 2 shows a configuration of an optical recording apparatus used for manufacturing a recording medium according to an embodiment of the invention.

FIG. 2 shows a configuration of an optical recording apparatus used for manufacturing a recording medium according to an embodiment of the invention. Since a recording medium and a recording medium master according to the embodiment of the invention are embodied through an exposing method of the patterns of pits and grooves by the optical recording apparatus, and a method of manufacturing a recording medium including the exposing method, the description thereof will be provided together hereinafter.

Figure 3:
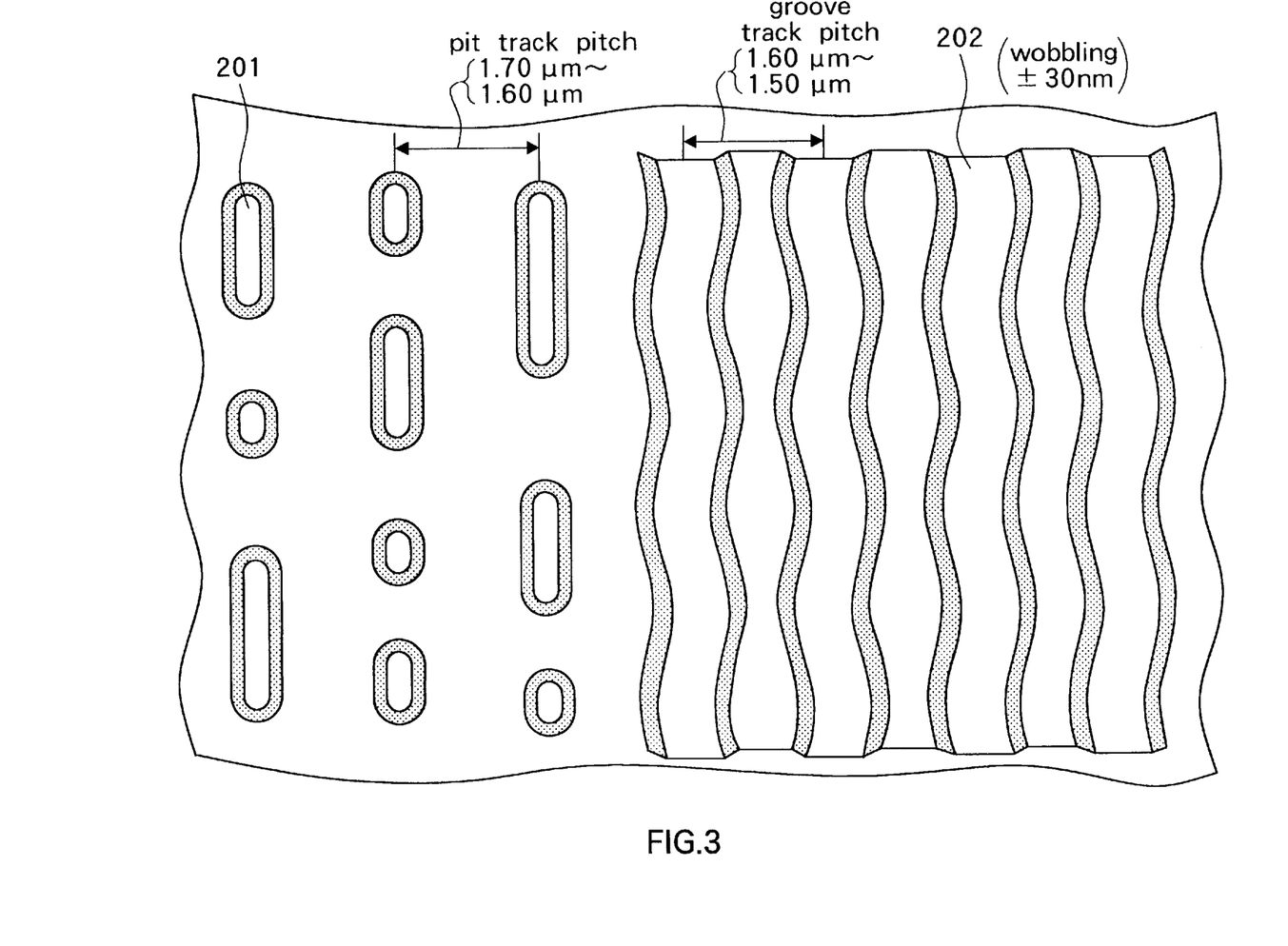
FIG. 3 shows pits and grooves of the recording medium according to the embodiment of the invention.

A recording medium according to the embodiment is an MD as shown in FIG. 3 in which pit track formed of a pit string 201 in a read-in track area and groove track 202, a wobbling grooves, in a data recording area are formed as a sequential spiral-shape on a surface of a substrate. The read-in track area is formed between a radius of 14.5 mm and 16.0 mm and the data recording area is formed between a radius of 16.0 mm and 30.5 mm.

The ratio of the pit track pitch to the groove track pitch is from 1.00 exclusive to 1.13 inclusive. If the recording medium is so-called an MD, it is preferable that the absolute value of the groove track pitch is 1.60 $\mu$m or less, for example, 1.51 $\mu$m. This is to obtain a high capacity capable of recording/reproducing for longer time than an ordinary MD by narrowing the track pitch. However, it is not limited to this but a wider track pitch larger than 1.60 $\mu$m exclusive may be applicable if a long-time recording/reproducing is not required.

The pit track pitch can be set to be 1.70 $\mu$m in case of 1.60 $\mu$m-groove track pitch and to be 1.60 $\mu$m in case of 1.51 $\mu$m-groove track pitch, for example. At this time, the ratios of both track pitches are 1.063 in the first case and 1.060 in the second case. In both cases, the ratio is within the range of 1.00 exclusive and 1.13 inclusive.

When the maximum capacity is ensured while complying with the standards capable of reading/writing using a standard data recording/reproducing apparatus by setting the groove track pitch 1.50 $\mu$m, which is the minimum value of the standard of track pitch (within the range of 1.60±0.10 $\mu$m), and the pit track pitch is set to 1.70 $\mu$m, which is the maximum value of the standards, the ratio is 1.13 (the upper limit of the preferable range). By setting the values as described, the maximum capacity of MD can be ensured while enabling reading/writing using an ordinary data recording/reproducing apparatus and optical detection of the pits 201 can be reliably performed. However, the combination and ratio of the values of the pit track and groove track are not limited to the best mode as described. As the practically preferable range of the values, it is possible to set the value of the groove track pitch within the range of 1.50 $\mu$m to 1.70 $\mu$m and the ratio of the pit track pitch to the groove track pitch within the range of 1.00 exclusive to 1.13 inclusive.

Among a method of manufacturing a recording medium according to the embodiment, a step of manufacturing a master glass of a recording medium, a step of fabricating a stamper using the master glass, and a step of manufacturing a recording medium using the stamper will be described by putting the emphasis on the techniques of forming the pits 201 and the grooves 202.

As shown in FIG. 2, the optical recording apparatus used for manufacturing a recording medium of the embodiment comprises a turntable 17, a spindle servo 18, He—Cd laser light source 21, a mirror M1 and mirror M2, a drive circuit 25, a moving optical table 27, a voltage-controlled oscillator 29, a position sensor 30, a laser scale 31, an air slider 32 and a feed servo 33 as the main parts.

The He—Cd laser light source 21 is the light source for exposing resist formed over the surface of the master glass 28 as a recording medium and for oscillating a laser light 22 with, for example, a wavelength $\lambda$ of 441.6 nm for recording. However, as the light source for exposure, it is not specifically limited to the laser light source as described. The laser light 22 irradiated from the He—Cd laser light source 21 travels in a straight line as a parallel beam and changes the direction by being reflected by the mirror M1 and mirror M2, and then is lead to the moving optical table 27.

In the moving optical table 27, two wedge prisms 23 and an AOM/AOD (Acousto-optic Modulator/Acousto-optic Deflector) 24 are provided. The wedge prisms 23 and the AOM/AOD 24 are placed to keep the beam horizontal height, and the incident laser light as a parallel beam and the grating plane satisfy the Bragg condition. Tellurium oxide ($TeO_2$) is preferable for an acousto-optic element used for the AOM/AOD 24.

A predetermined signal is supplied from the drive circuit 25 to the AOM/AOD 24. The signal is EFM (Eight to Fourteen Modulation) when forming the pits 201, and is DC signal at a constant level when forming the grooves 202. The laser light is intensity-modulated (ON/OFF) by the EFM signal. A high-frequency signal is supplied from the VCO 29 to the drive circuit 25. A control signal is supplied to the VCO 29. The control signal from the VCO 29 is a direct current (DC) signal of zero level when forming the pits 201, and is the superimposed signal of a signal of 22.05 kHz and a signal of 5 MHz when forming the grooves 202. The signal of 22.05 kHz is for recording the wobbling information of address and the signal of 5 MHz is for enabling the width of the grooves 202 to be appropriately widened by the amount of amplitude. The AOM/AOD 24 utilize the fact that intensity of the primary diffracted light in Bragg diffraction is almost proportional to ultrasonic power, and performs an optical modulation of the laser light 22 by modulating the ultrasonic power based on the recording signal. In order to achieve Bragg diffraction, positioning and attitude of the AOM/AOD 24 with respect to the optical axis of the laser light are fixed so as to satisfy the Bragg condition; $2d\sin\theta = n\lambda$ (where d is grating interval, $\lambda$ is wavelength of laser light, $\theta$ is angle between laser light and grating plane, n is integer).

In the optical recording apparatus, a sequential spiral-shaped pattern of the pit track of the pits 201 and groove track of the grooves 202 are formed on the resist on the master glass 28 while changing the track pitches of the pits 201 and grooves 202. In order to achieve this, exposure is performed by setting the feed pitch of the moving optical table 27 to be, for example, 1.60 $\mu$m in the read-in track area where the pits 201 are formed and to be, for example, 1.51 $\mu$m in the data recording area where the grooves 202 are formed while controlling the number of turns of the turntable 17 so that the linear velocity in the longitudinal direction of the track becomes 1.20 m/s. In the optical recording apparatus, it is possible to expose the latent images of the patterns of the pits 201 and grooves 202 as described to the resist on the master glass 28 through detecting the position of the moving optical table 27 by the position sensor 30 and then exposing each area at a respective timing and pitch. Also, it is possible to instantly change the feed pitch of the moving optical table 27 by controlling the operation of the feed servo 33 and the air slider 32 based on the wavelength (for example, 0.78 $\mu$m) detected by the laser scale 31.

The laser light 22 modulated and deflected as described is irradiated to the resist on the master glass 28 by a mirror M3 and an objective lens 26 and forms the desired latent images of the pits 201 and the grooves 202.

Then, a developing process is applied to the master glass 28 so as to perform development by dissolving the exposed resist. Specifically, the undeveloped master glass 28 is placed on a turntable of a processor (not shown) and the resist on the surface of the master glass 28 is developed by dropping developer while turning the turntable. As a result, the master glass 28 in which the pits 201 with a track pitch of, for example, 1.51 $\mu$m and the grooves 202 carrying information of ADIP (Address In Pregroove) with a track pitch of 1.60 $\mu$m are patterned can be obtained. A magnifying lens L3 can be set the focal length to be, for example, 80 mm and the number of openings NA of the objective lens 26 to be, for example, 0.9.

As described, the master glass 28, which is used for manufacturing an MD with a high capacity capable of recording/reproducing for 80 minutes with, for example, an ordinary data recording/reproducing apparatus and of precise reading-out of information of the pits 201 and the grooves 202 can be obtained.

Then, a conductive layer made of nickel (Ni) thin film is formed on the concavo-convex pattern on the master glass 28 by using, for example, an electroless plating apparatus (not shown). The master glass 28 on which the conductive layer is formed is attached to an electroforming apparatus. Then, a nickel plating layer of about 300±5 $\mu$m am thick is formed on the conductive layer by electroplating.

Then, the nickel-plating layer is peeled from the master glass 28 by cutter or squeegee for peeling. Then, the residual resist on the surface where the nickel-plating layer was formed is cleaned by a solvent such as acetone, thereby obtaining a stamper (not shown).

Figure 4:
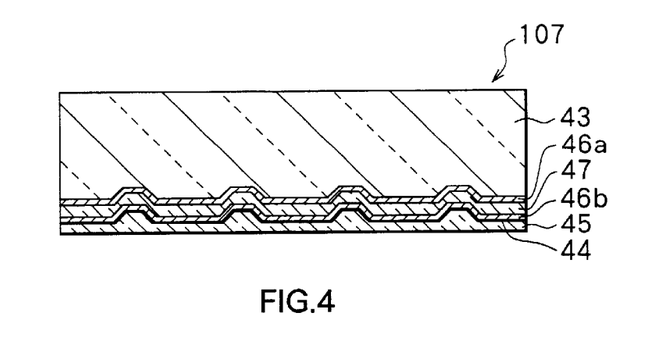
FIG. 4 is the main cross section of the recording medium (MD).

Next, by using the stamper, minute concavo-convex patterns of the pits 201 and the grooves 202 corresponding to signal patterns are transferred on the surface of a substrate 43 made of a transparent plastic such as PC (polycarbonate) as shown in FIG. 4. Then, by using a sputtering apparatus (not shown) and the like, a dielectric film 46a made of silicon nitride ($Si_3N_4$), a magneto-optical recording layer 47 made of terbium-iron-cobalt (TbFeCo), a dielectric film 46b made of silicon nitride, and a reflection layer 44 made of aluminum alloy (for example, Al—Ti) are formed in this order on the recording surface of the substrate 43. On the reflection layer 44, 2P (Photo Polymerization) resin is smoothly applied so as to cover almost the entire surface of the substrate 43. Then, the resin is hardened by irradiating the light of UV lamp, thereby forming a protective film 45. As described, an MD as a recording medium is completed. The materials for forming the dielectric layer and magneto-optical recording layer and the like of the MD are not limited to the ones mentioned above but various other kinds of materials are applicable.

EXAMPLE

By the method of manufacturing an MD mentioned above, three magneto-optical discs 107 (Type A, Type B, Type C) for evaluation with different track pitches of the pits 201 were manufactured.

Figure 5:
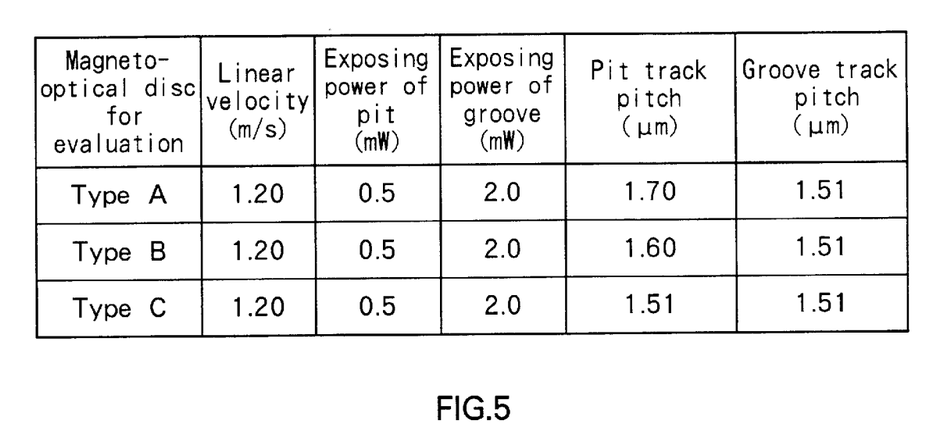
FIG. 5 shows the exposure conditions of three masters for evaluation.

First, three kinds of master glasses 28 were fabricated. The conditions of exposure were, as shown in FIG. 5, as follows: linear velocity was 1.20 m/s; groove track pitch was 1.51 μm; exposing power of the grooves 202 was 2.0 mW; exposing power of the pits 201 was 0.5 mW; the amount of wobbling in the grooves 202 was ±30 nm (0.03 μm); pit track pitches in Type A was 1.70 μm, in Type B was 1.60 μm and in Type C was 1.51 μm. The thicknesses of the resists in each of the three master glasses 28 corresponding to the three magneto-optical discs were set to be the same. Also, the conditions of exposure of the master glasses 28, the models of resists and the like were set so that the depths of the pits 201 and the grooves 202 in the three magneto-optical discs for evaluation became the same and the widths of the pits and the grooves in the radial direction of the discs became the same. Stampers were fabricated by using each of the three master glasses 28, and then three kinds of magneto-optical discs 107 for evaluation were fabricated using the stampers. The characteristics of each magneto-optical disc 107 were evaluated by placing the discs one by one on an MD evaluator.

Figure 6:
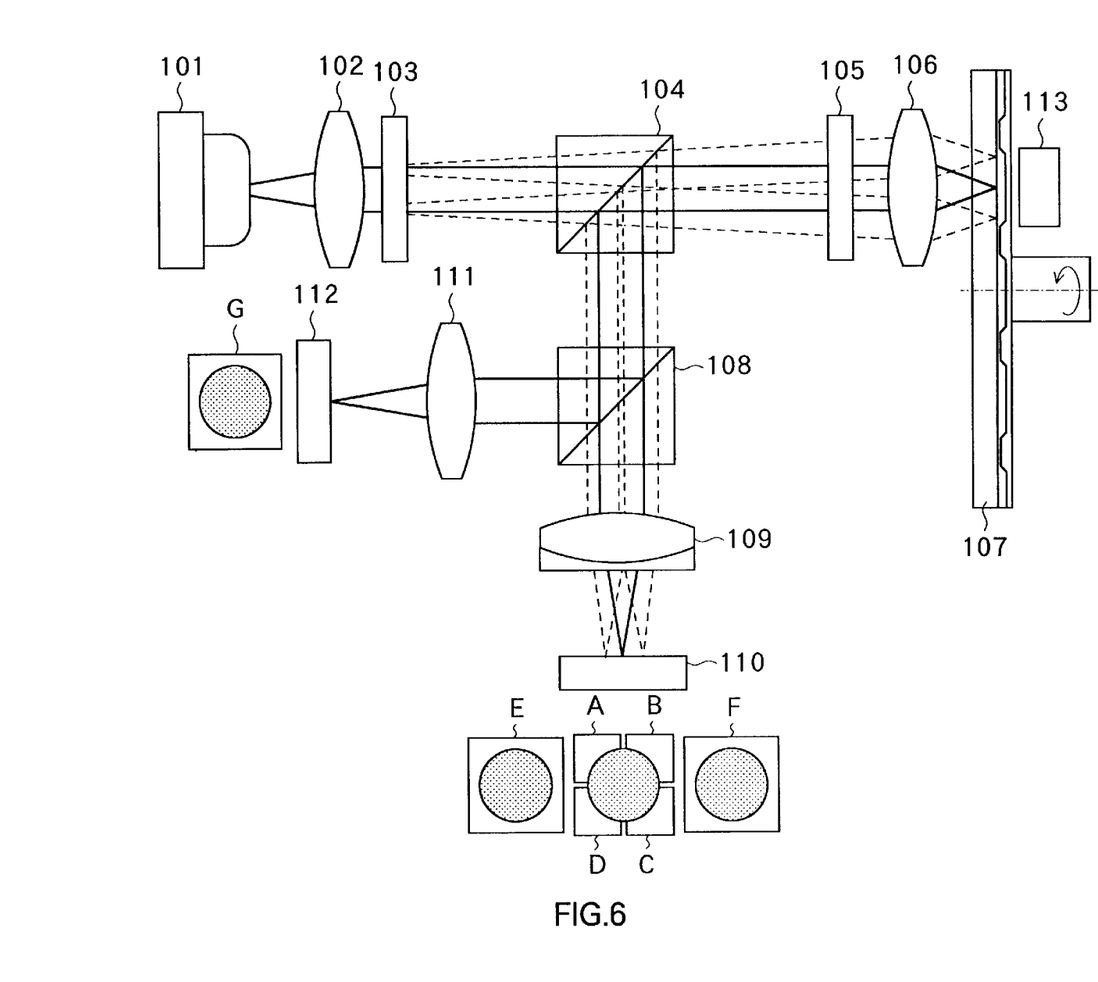
FIG. 6 specifically shows main configuration of an optical head of an MD evaluator.

An optical head of the MD evaluator used for evaluation was composed of a main part as shown in FIG. 6. A laser beam 100 outputted from a semiconductor laser 101, the light source, is to be a parallel beam by a collimation lens 102 and is divided into three beams when going through a grating 103. Zero-order light from the grating 103 is to be the main beam and ±1-order light is to be the side beams. The main beam and the side beams of P-polarized light become circularly polarized light by transmitting through a polarization beam splitter 104 and ¼ wavelength plate 105, and then become three light spots by being converged on the magneto-optical discs 107 by the objective lens 106. The light spot of the main beam (in the middle) is used for reading/writing of data and the light spots of the side beams (the other two) are used for detecting tracking errors.

The reflection light from the magneto-optical discs 107 again passes through the objective lens 106 and the ¼ wavelength plate 105 in the opposite direction of the initial irradiation. Then, optical path of the reflection light is changed by a right angle at a polarization beam splitter 104 entering into a polarization beam splitter 108. At this time, the laser light converts from the circularly polarized light to S-polarized light. The polarization beam splitter 108 separates the S-polarized lights and P-polarized lights from the main beam and respectively enters each beam into a combination lens 109 and a lens 111.

The laser light of S-polarized lights entered the combination lens 109 is entered a photodiode 110 via the lens system which gives astigmatism to the beams, converted to electric signals corresponding to the intensity of the beams, and then is outputted to the servo circuit (not shown) as servo signals (a focus-error signal and a tracking error signal).

The photodiode 110 comprises divided detectors A to F. The return light of the main beam enters the detectors A, B, C, and D and the return light of the side beams enters the detectors E and F. The laser light reflected by the polarization beam splitter 108 enters a photodiode 112 via the lens 111. The photodiode 112 comprises a detector G. The laser light of P-polarized lights separated by the polarization beam splitter 108 is to enter the detector G.

Each signals a to g outputted from the detectors A to G are added/subtracted in a circuit (not shown). Thereby, predetermined signals as will be described later are outputted. In the magneto-optical disc 107, polarization of the return light for data detection varies in accordance with data recorded on the magneto-optical disc. Therefore, data can be detected based on a difference between the polarization received in the detectors A, B, C and D of the photodiode 110 and in the detector G of the photodiode 112. The pit-reproducing signal is reproduced by sum signals like a CD signal and the like. The focus servo is controlled based on the return light of the main beam enters the photodiode 110. Specifically, calculations noted in the followings are performed.

Magneto-Optical Reproducing (MO) Signal=$(a+b+c+d)-g$

Pits Reproducing Signal (EFM Signal)=$(a+b+c+d)$ or $g$

Focus-Error Signal=$(a+c)-(b+d)$

Figure 7:
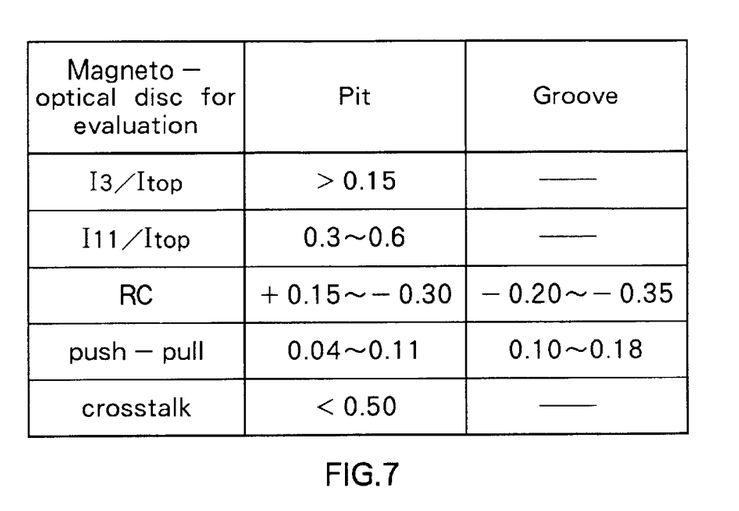
FIG. 7 shows the main standards of MD format regarding the recording/reading-out characteristics.
Figure 8:
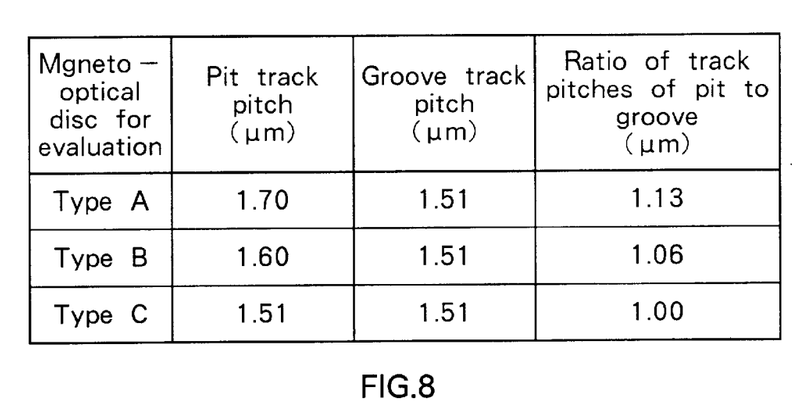
FIG. 8 shows the track pitches of the pits and grooves of the three kinds of magneto-optical discs evaluated in the Example and the ratio of the both track pitches.
Figure 9:
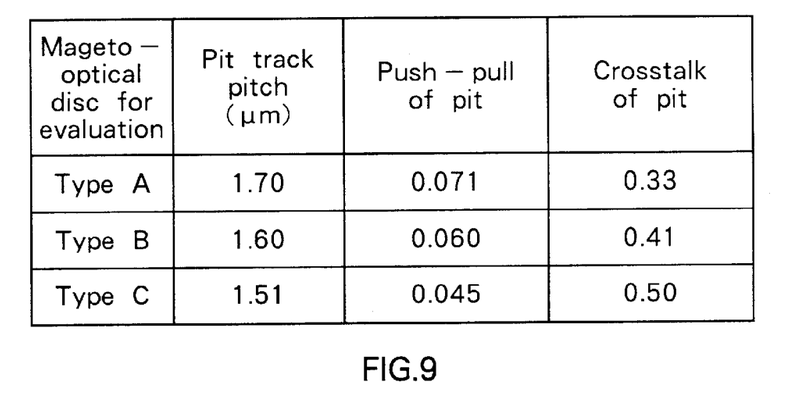
FIG. 9 shows the results of the evaluation performed on the three magneto-optical discs manufactured in the Example.

The standards of the MD format are as shown in FIG. 7. Based on the standards, the three magneto-optical discs 107 for evaluation substantially obtained were evaluated. The results of the evaluation are shown altogether in FIG. 9. The track pitches of the pits 201 and the grooves 202 of each three magneto-optical discs 107 and the ratio of the track pitches are shown altogether in FIG. 8.

In Type A and Type B out of the three magneto-optical discs for evaluation, the track pitches of the pits 201 and the grooves 202 were formed to be different. In these types, sufficient modulation factor (I3, I11 in FIG. 7) and sufficient amount of RC signal were obtained, thereby enabling an excellent reproduction. Also, the amount of the RC signal and the push-pull signal in the grooves 202 were sufficient, thereby enabling an excellent recording/reproducing of data. Therefore, even if the track pitch of the grooves 202 was as narrow as 1.51 μm, the wobbling signals of ADIP could be reproduced stably using the push-pull signal $((a+b)-(c+d))$. Also, the magneto-optical signal (MO signal) could be precisely recorded by increasing the recording power up to 4.0 mW by applying magnetic field to a magnetic disc 7 by a recording head 13.

On the contrary, in the case of Type C disc where the track pitch of the pits 201 was 1.51 μm, the result was that it was difficult to comply with the MD standard especially in respect to the characteristic of the push-pull signal and incidence of crosstalk. At this time, the track pitch of the grooves 202 was 1.51 μm. Therefore, the track pitches of the pits 201 and the grooves 202 were set to be the same as in the models of conventional MD. In other words, the ratio of the pit track pitch to the groove track pitch was exactly 1.00.

From the results, as in Type A and Type B of the magneto-optical discs for evaluation, the MD standard is complied in respect to the characteristic of the push-pull signal and incidence of crosstalk of the pits 201 by setting the track pitch of the grooves 202 as narrow as 1.51 μm and the track pitch of the pits 201 larger than that of the grooves 202 such as 1.60 μm or 1.70 μm. In addition, it is possible to achieve the high capacity MD capable of long-time recording/reproducing for 80 minutes using a conventional data recording/reproducing apparatus for MD by increasing the density of grooves 202 in the radial direction of the disc. Also, the same result as mentioned above can be achieved when the track pitch of the grooves 202 is 1.50 μm.

Based on the results of the evaluation in the above-mentioned Example, the appropriate minimum track pitch of the pits 201 may be 1.60 μm. However, it could be smaller than 1.60 μm exclusive as far as provided the ratio of the track pitches of the pits 201 to the grooves 202 is within the range of 1.00 exclusive to 1.13 inclusive.

The above-mentioned embodiment has been described by referring to a magneto-optical disc, specifically an MD with a large capacity capable of data recording/reproducing for 80 minutes in Example and the like. However, the recording medium, the recording medium master, and the method of manufacturing the recording medium are not limited to those mentioned above. The invention is also applicable to other various kinds of optical discs and the like in which the pits and the grooves are formed in a sequential spiral shape such as DVD+RW3.0 GB.

As described, in the recording medium and the recording medium master, and the method of manufacturing the recording medium of the invention, the track pitch of the pits is wider than that of the grooves, and the ratio thereof is from 1.00 exclusive to 1.13 inclusive. As a result, optical detection of pits can be precisely performed while enabling the characteristic of data recording/reproducing to comply with the MD standard.

Especially, in a recording medium and a recording medium master, and a method of manufacturing the recording medium in one aspect of the invention, the ratio of the track pitch of the pits to the track pitch of the grooves is from 1.00 exclusive to 1.13 inclusive and the track pitch of the grooves is from 1.50 $\mu$m inclusive to 1.70 $\mu$m exclusive. Therefore, the track pitches of both the grooves and the pits can be formed to be within the allowable range of 1.60±0.10 $\mu$m, which is a requirement of the track pitch in an ordinary data recording/reproducing apparatus. This allows recording and reproducing various kinds of information on/from the recording medium of the invention by using an ordinary data recording/reproducing apparatus having the allowable range of the track pitch of 1.60±0.10 $\mu$m without any modification.

In a recording medium in another aspect of the invention, the pit width is narrower than half of its track pitch. As a result, crosstalk in the pits can be reduced or avoided.

In a recording medium in still another aspect of the invention, the groove width is wider than half of its track pitch. Therefore, crosstalk in the pits can be reduced or avoided and excellent recording/reproducing characteristics can be achieved.

Obviously many modifications and variations of the present invention are possible in the light of above teachings. It is therefore to be understood that within the scope of the appended claims the invention may be practiced otherwise than as specifically described.

What is claimed is:

1. A recording medium comprising:

pits and grooves on a surface of a disc-shaped substrate arranged to form a spiral-shaped track, wherein information carried in the pits and the grooves is read by irradiating a laser with a wavelength of 0.78±0.01 $\mu$m and NA of 0.45±0.01 along the track, and wherein a ratio of a track pitch of the pits to a track pitch of the grooves is from 1.00 exclusive to 1.13 inclusive.

2. The recording medium as claimed in claim 1, wherein the track pitch of the grooves is from 1.50 $\mu$m inclusive to 1.70 $\mu$m exclusive.

3. The recording medium as claimed in claim 1, wherein the pits have a width narrower than half of the track pitch of the pits.

4. The recording medium as claimed in claim 1, wherein the grooves are wobbling grooves having a width wider than half of the track pitch of the grooves.

5. A recording medium comprising:

pits and grooves on a surface of a disc-shaped substrate arranged to form a spiral-shaped track, wherein information carried in the pits and the grooves is read along the track, and wherein a ratio of a track pitch of the pits to a track pitch of the grooves is from 1.00 exclusive to 1.13 inclusive.

6. The recording medium as claimed in claim 5, wherein the track pitch of the grooves is from 1.50 $\mu$m inclusive to 1.70 $\mu$m exclusive.

7. The recording medium as claimed in claim 5, wherein the pits have a width narrower than half of the track pitch of the pits.

8. The recording medium as claimed in claim 5, wherein the grooves are wobbling grooves having a width wider than half of the track pitch of the grooves.

9. A recording medium master used in a step of manufacturing a recording medium comprising pits and grooves on a surface of a disc-shaped substrate arranged to form a spiral-shaped track, wherein information carried in the pits and the grooves is read along the track in order to form the pits and the grooves on the surface of the substrate, and wherein a ratio of a track pitch of the pits to the a track pitch of the grooves is from 1.00 exclusive to 1.13 inclusive.

10. The recording medium master as claimed in claim 9, wherein the track pitch of the grooves is from 1.50 $\mu$m inclusive to 1.70 $\mu$m exclusive.

11. A method of manufacturing a recording medium comprising pits and grooves on a surface of a disc-shaped substrate arranged to form a spiral-shaped track, wherein information carried in the pits and the grooves is read along the track, comprising:

forming the pits and the grooves with a ratio of a track pitch of the pits to a track pitch of the grooves from 1.00 exclusive to 1.13 inclusive.

12. The method of manufacturing a recording medium as claimed in claim 11, wherein the pits and the grooves are formed with the track pitch of the grooves being from 1.50 $\mu$m inclusive to 1.70 $\mu$m exclusive.

* * * * *

UNITED STATES PATENT AND TRADEMARK OFFICE
CERTIFICATE OF CORRECTION

PATENT NO. : 6,654,337 B2  Page 1 of 1
DATED : November 25, 2003
INVENTOR(S) : Sohmei Endoh et al.

It is certified that error appears in the above-identified patent and that said Letters Patent is hereby corrected as shown below:

Title page,
Item [57], ABSTRACT,
Line 8, change "form a grooves" to -- form a spiral-shaped track. The track pitch of the pits is wider than that of the --.

Column 10,
Line 35, change "pits to the a track" to -- pits to a track --.

Signed and Sealed this

Twenty-second Day of June, 2004

JON W. DUDAS
*Acting Director of the United States Patent and Trademark Office*